(12) United States Patent
Lingam et al.

(10) Patent No.: US 9,952,865 B2
(45) Date of Patent: *Apr. 24, 2018

(54) LOW ENERGY ACCELERATOR PROCESSOR ARCHITECTURE WITH SHORT PARALLEL INSTRUCTION WORD AND NON-ORTHOGONAL REGISTER DATA FILE

(71) Applicant: Texas Instruments Incorporated, Dallas, TX (US)

(72) Inventors: Srinivas Lingam, Dallas, TX (US); Seok-Jun Lee, Allen, TX (US); Johann Zipperer, Unterschleissheim (DE); Manish Goel, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/678,944

(22) Filed: Apr. 4, 2015

(65) Prior Publication Data

US 2016/0291974 A1 Oct. 6, 2016

(51) Int. Cl.
*G06F 9/30* (2006.01)
*G06F 13/16* (2006.01)
*G06F 13/40* (2006.01)

(52) U.S. Cl.
CPC .......... *G06F 9/3013* (2013.01); *G06F 9/3001* (2013.01); *G06F 9/30036* (2013.01);
(Continued)

(58) Field of Classification Search
CPC ............... G06F 9/3001; G06F 9/30021; G06F 9/30036; G06F 9/30043; G06F 9/3004;
(Continued)

(56) References Cited

U.S. PATENT DOCUMENTS 5,784,585 A 7/1998 Denman
5,822,606 A * 10/1998 Morton ..................... G06F 8/45
711/E12.051

(Continued)

OTHER PUBLICATIONS

"MSP Low-Power Microcontrollers", Texas Instruments, www.ti.com/msp, 2015, 41 pgs.
(Continued)

*Primary Examiner* — Ernest Unelus
(74) *Attorney, Agent, or Firm* — Kenneth Liu; Charles A. Brill; Frank D. Cimino

(57) ABSTRACT

An apparatus for a low energy accelerator processor architecture is disclosed. An example arrangement is an integrated circuit that includes a system bus having a data width N, where N is a positive integer; a central processor unit is coupled to the system bus and configured to execute instructions retrieved from a memory; a low energy accelerator processor is configured to execute instruction words received on the system bus and has a plurality of execution units including a load store unit, a load coefficient unit, a multiply unit, and a butterfly/adder ALU unit, wherein each of the execution units is configured to perform operations responsive to retrieved instruction words; and a non-orthogonal data register file comprising a set of data registers coupled to the plurality of execution units, wherein the registers coupled to selected ones of the plurality of execution units. Additional methods and apparatus are disclosed.

20 Claims, 16 Drawing Sheets

(52) U.S. Cl.
CPC ...... *G06F 13/1678* (2013.01); *G06F 13/4018* (2013.01); *G06F 13/4022* (2013.01); *Y02B 60/1228* (2013.01); *Y02B 60/1235* (2013.01)

(58) Field of Classification Search
CPC .... G06F 9/3885; G06F 9/30018; G06F 15/80; G06F 9/3013
See application file for complete search history.

(56) References Cited

U.S. PATENT DOCUMENTS

| | | | |
|---|---|---|---|
| 5,835,392 A * | 11/1998 | Dulong | G06F 17/142 708/404 |
| 5,961,575 A | 10/1999 | Hervin et al. | |
| 5,978,838 A | 11/1999 | Mohamed et al. | |
| 5,983,256 A * | 11/1999 | Peleg | G06F 7/4812 708/523 |
| 6,317,820 B1 | 11/2001 | Shiell et al. | |
| 6,574,724 B1 | 6/2003 | Hoyle et al. | |
| 7,281,117 B2 | 10/2007 | Tanaka et al. | |
| 7,386,326 B2 | 6/2008 | Sundararajan et al. | |
| 7,587,577 B2 * | 9/2009 | Royer | G06F 9/3879 711/147 |
| 7,681,013 B1 * | 3/2010 | Trivedi | G06F 9/30032 341/67 |
| 7,937,559 B1 | 5/2011 | Parameswar et al. | |
| 8,065,506 B2 | 11/2011 | Xi et al. | |
| 2005/0005180 A1 | 1/2005 | Webster | |
| 2005/0251644 A1 | 11/2005 | Maher | |
| 2008/0071848 A1 | 3/2008 | Baireddy | |
| 2008/0141012 A1 | 6/2008 | Yehia et al. | |
| 2008/0263285 A1 * | 10/2008 | Sharma | G06F 9/30014 711/147 |
| 2009/0063820 A1 | 3/2009 | Xi et al. | |
| 2009/0150654 A1 | 6/2009 | Oberman et al. | |
| 2009/0265409 A1 * | 10/2009 | Peleg | G06F 7/4812 708/501 |
| 2010/0191979 A1 | 7/2010 | Zipperer et al. | |
| 2010/0211761 A1 * | 8/2010 | Dasgupta | G06F 9/30036 712/205 |
| 2013/0145124 A1 | 6/2013 | Qiu et al. | |
| 2014/0280420 A1 | 9/2014 | Khan | |
| 2015/0121043 A1 | 4/2015 | Lee et al. | |
| 2016/0292127 A1 | 10/2016 | Lingam | |
| 2017/0060586 A1 | 3/2017 | Lingam | |

OTHER PUBLICATIONS

Plant et al., "MSP432 Microcontrollers: Bringing High Performance to Low-Power Applications", Texas Instruments, Mar. 2015, 11 pgs.

* cited by examiner

FIG. 8

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 0 | | | | | | | | | | | | | | | | | | | | | | | | | | | | | | | |
| | | | | | | | | | | | | | | | | par_mpy_bfly_ls_ld | | | | | | | | | | | | | | | |
| | | | | | | | | | | | | | | | | | | | | | | | b : bfly | | | | | | | | |
| | ls : ldstA | | | | | | | ld : ld_R | | | | | m : mpy | | | | | | | bfly_opn | | | | | | | | | | | |
| | | | | | | | | ld_ARc | | | | ld_R_rdx2 | | | | mpy_opn | | | | op : bfly_op | | | s1 : mRc | | | s2 : mRc | | | d1 : mRc | | |
| | 00 | | | | | | | | | | | | 10 | | | 0 | | | | | | | i : t3u | | | i : t3u | | | i : t3u | | |
| | 0110 | | | | st_A | | | 0 | | | | 0 | nop | | | | | | | 000 ADDC | | | | | | | | | | | |
| | 0111 | | | | st_ovf_A | | | nop | | | | 1 | 11xxxx | | | | | | | 001 SUBC | | | | | | | | | | | |
| | 010 | | | | add_ptrs | | | | | | | | | | | | | | | 010 ADDH_SUBL | | | | | | | | | | | |
| | | nop | | | | | | | | | | | | | | | | | | 011 SUBH_ADDL | | | | | | | | | | | |
| | | 1xxxxxxxxx | | | | | | | | | | | | | | | | | | 100 ADDL | | | | | | | | | | | |
| | | | | | | | | | | | | | | | | | | | | 101 SUBL | | | | | | | | | | | |
| | | | | | | | | | | | | | | | | | | | | 110 SHR_ADDSU | | | | | | | | | | | |
| | | | | | | | | | | | | | | | | | | | | 111 SHR_ADDSS | | | | | | | | | | | |
| | | | | | | | | | | | | | | | | | | | | 11000 | | | | | minmax | | | | | | |
| | | | | | | | | | | | | | | | | | | | | 11001 | | | | | minmax_sh | | | | | | |
| | | | | | | | | | | | | | | | | | | | | 11010 | | | | | cmpr | | | | | | |
| | | | | | | | | | | | | | | | | | | | | | | | pass | | | | | | | lshift | |
| | | | | | | | | | | | | | | | | | | | | | | | pass | | | | | | | rshift | |
| | | | | | | | | | | | | | | | | | 10 | | | | | | nop | | | | | | | | |
| | | | | | | | | | | | | | | | | | | | | 111xxxxxxxxxx | | | | | | | | | | | |
| | | | | | | | | | | | | | | | 11100xxxxxxxxxxxxxx | | | | | | | | | pass | | | | | | | |
| | | | | | | | | | | | | | | | 11010xxxxxxxxxxxxxxxxxxxx | | | | | | | | | cmpr | | | | | | | |
| | | | | | | | | | | | | | | | 11011xxxxxxxxxxxxxxxxxxxx | | | | | | | | | | | | | | | |
| | | | | | | | | | | | | | | | 10000xxxxxxxxxxxxxxxx | | | | | | | | | | | | | | | |
| | 10001xxxxxxxxx | | | | | | | | | | | | | | | | | | | load_imm | | | | | | | | | | | |
| | 101xxxxxxxx | | | | | | | | | | | | | | | | | | | load_zero | | | | | | | | | | | |
| | 110000xxxxxxxxxxx | | | | | | | | | | | | | | | | | | | load_cnt | | | | | | | | | | | |
| | 110001xxxxxxxxxxx | | | | | | | | | | | | | | | | | | | doloop | | | | | | | | | | | |
| | | | | | | | | | | | | | | return | | | | | | | | | | | | | | | | | |
| | 11101xxxxxxxxxxxxxxxxxxxxxxxxxx | | | | | | | | | | | | | | | | | | | | | | | | | | | | | | |

800

900

| 0 | 1 | 2 | 3 | 4 | 5 | 6 | 7 | 8 | 9 | 10 | 11 |
|---|---|---|---|---|---|---|---|---|---|---|---|
| 0 | | | | ls : ldstA | | | | | | | |
| | 00 | | | ld_ARc | | | | | | | |
| | | | | d : mRcLDC | | m : addr_modeA | | | | s : scl_modeA | |
| | | | 0 | mRcLd | | m : eAddr_mode | sd : mPM | ss : mSP | | s : eScl_mode | |
| | | | | ld0_reg | | 00 add | i : t2u | i : t2u | | 0 ns | |
| | | | | 0 | | 01 sub | | | | 1 sscale | |
| | | | | ld1_reg | | 10 incr_mask | | | | | |
| | | | | 1 | | 11 brev | | | | | |
| | | | 1 | mMdcRegs | | | | | | | |
| | | | | mdata_reg | | | | | | | |
| | | | | 0 | | | | | | | |
| | | | | mcoef_reg | | | | | | | |
| | | | | 1 | | | | | | | |
| | 011 | | | | | st_A | | | | | 0 |
| | | | | s : eRcSt | | m : addr_modeA | | | | | |
| | | | | 0 c4 | | m : eAddr_mode | sd : mPM | ss : mSP | | | |
| | | | | 1 c5 | | 00 add | i : t2u | i : t2u | | | |
| | | | | | | 01 sub | | | | | |
| | | | | | | 10 incr_mask | | | | | |
| | | | | | | 11 brev | | | | | |
| | 011 | | | | | st_ovf_A | | | | | 1 |
| | | | | s : eRcSt | | m : addr_modeA | | | | | |
| | | | | 0 c4 | | m : eAddr_mode | sd : mPM | ss : mSP | | | |
| | | | | 1 c5 | | 00 add | i : t2u | i : t2u | | | |
| | | | | | | 01 sub | | | | | |
| | | | | | | 10 incr_mask | | | | | |
| | | | | | | 11 brev | | | | | |

| 12 |
|---|
| ld : ld_R |
| ld_R_rdx2 |
| 0 |
| nop |
| 1 |

| 13 | 14 | 15 | 16 | 17 | 18 |
|---|---|---|---|---|---|
| | | \multicolumn{4}{c}{m : mpy} |
| | 10 | \multicolumn{4}{c}{mpy_opn} |
| | | s1 : mdreg | s2 : mcreg | \multicolumn{2}{c}{dst : mRMo} |
| | | mdr_reg | mcr_reg | \multicolumn{2}{c}{mRrMo} |
| | | 0 | 0 | \multicolumn{2}{c}{mor0_reg} |
| | | mdi_reg | mci_reg | \multicolumn{2}{c}{00} |
| | | 1 | 1 | \multicolumn{2}{c}{mor1_reg} |
| | | | | \multicolumn{2}{c}{01} |
| | | | | \multicolumn{2}{c}{mRiMo} |
| | | | | \multicolumn{2}{c}{moi0_reg} |
| | | | | \multicolumn{2}{c}{10} |
| | | | | \multicolumn{2}{c}{moi1_reg} |
| | | | | \multicolumn{2}{c}{11} |
| | 0 | \multicolumn{4}{c}{mpyl_opn} |
| | | op : mul2_op | s1 : mdreg | s2 : mcreg | dst : mRcMo |
| | | 00  MULSS | mdr_reg | mcr_reg | mo0_reg |
| | | 01  MULSU | 0 | 0 | 0 |
| | | 10  MULUS | mdi_reg | mci_reg | mo1_reg |
| | | 11  MULUU | 1 | 1 | 1 |
| | | \multicolumn{4}{c}{nop} |
| | | \multicolumn{4}{c}{111111} |

| 19 | 20 | 21 | 22 | 23 | 24 | 25 | 26 | 27 | 28 | 29 | 30 | 31 |
|---|---|---|---|---|---|---|---|---|---|---|---|---|
| 0 | \multicolumn{12}{c|}{bfly_opn} |
|  | \multicolumn{4}{c|}{op : bfly_op} |  | \multicolumn{3}{c|}{s1 : mRc} | \multicolumn{3}{c|}{s2 : mRc} | \multicolumn{2}{c|}{d1 : mRc} |
|  | \multicolumn{2}{c|}{000} | \multicolumn{2}{c|}{ADDC} |  | \multicolumn{3}{c|}{i : t3u} | \multicolumn{3}{c|}{i : t3u} | \multicolumn{2}{c|}{i : t3u} |
|  | \multicolumn{2}{c|}{001} | \multicolumn{2}{c|}{SUBC} | | | | | | | | | |
|  | \multicolumn{2}{c|}{010} | \multicolumn{2}{c|}{ADDH_SUBL} | | | | | | | | | |
|  | \multicolumn{2}{c|}{011} | \multicolumn{2}{c|}{SUBH_ADDL} | | | | | | | | | |
|  | \multicolumn{2}{c|}{100} | \multicolumn{2}{c|}{ADDL} | | | | | | | | | |
|  | \multicolumn{2}{c|}{101} | \multicolumn{2}{c|}{SUBL} | | | | | | | | | |
|  | \multicolumn{2}{c|}{110} | \multicolumn{2}{c|}{SHR_ADDSU} | | | | | | | | | |
|  | \multicolumn{2}{c|}{111} | \multicolumn{2}{c|}{SHR_ADDSS} | | | | | | | | | |

- Row header 0: bfly_opn
  - op : bfly_op | s1 : mRc | s2 : mRc | d1 : mRc
  - 000 ADDC | i : t3u | i : t3u | i : t3u
  - 001 SUBC
  - 010 ADDH_SUBL
  - 011 SUBH_ADDL
  - 100 ADDL
  - 101 SUBL
  - 110 SHR_ADDSU
  - 111 SHR_ADDSS

- 11000: minmax
  - op : minmax_op | s1 : mRc | s2 : mRc
  - 00 MAX | i : t3u | i : t3u
  - 01 MAXU
  - 10 MIN
  - 11 MINU

- 11001: minmax_sh
  - op : minmax_sh_op | s1 : mRc | s2 : mRc
  - 00 MAX | i : t3u | i : t3u
  - 01 MAXU
  - 10 MIN
  - 11 MINU

- 1101: cmpr
  - 0: compare_rcrc
    - op : compare_op | s1 : mRc | s2 : mRc
    - 00 lt | i : t3u | i : t3u
    - 01 ltu
    - 10 gt
    - 11 gtu
  - 1: compare_rr
    - op : compare_op | 0 | s1 : mRLd | 0 | s2 : mRLd
    - 00 lt | | mRrLd | | mRrLd
    - 01 ltu | | ldr0_reg | | ldr0_reg
    - 10 gt | | 00 | | 00
    - 11 gtu | | ldr1_reg | | ldr1_reg
    - | | 01 | | 01
    - | | mRiLd | | mRiLd
    - | | ldi0_reg | | ldi0_reg
    - | | 10 | | 10
    - | | ldi1_reg | | ldi1_reg
    - | | 11 | | 11

| 19 | 20 | 21 | 22 | 23 | 24 | 25 | 26 | 27 | 28 | 29 | 30 | 31 |
|---|---|---|---|---|---|---|---|---|---|---|---|---|
| | | 1110 | | | arith_opn | | | | | | | |
| | | | | arith | s1 : mR | | | | s2 : mR | | | |
| | | | | ADI | mRr | | | | mRr | | | |
| | | | | SUB | 0 | i : t3u | | | 0 | i : t3u | | |
| | | | | | mRi | | | | mRi | | | |
| | | | | | 1 | i : t3u | | | 1 | i : t3u | | |
| | | 11110 | | | select_opn | | | | | | | |
| | | | | | s1 : mR | | | | s2 : mR | | | |
| | | | | | mRr | | | | mRr | | | |
| | | | | | 0 | i : t3u | | | 0 | i : t3u | | |
| | | | | | mRi | | | | mRi | | | |
| | | | | | 1 | i : t3u | | | 1 | i : t3u | | |
| 10 | | | | | pass | | | | | | | |
| | | 000 | | | mv_RR | | | | | | | |
| | | | | | s1 : mR | | | | dst : mR | | | |
| | | | | | mRr | | | | mRr | | | |
| | | | | | 0 | i : t3u | | | 0 | i : t3u | | |
| | | | | | mRi | | | | mRi | | | |
| | | | | | 1 | i : t3u | | | 1 | i : t3u | | |
| | | 01000 | | | | | mv_RcRc | | | | | |
| | | | | | | | s1 : mRc | | dst : mRc | | | |
| | | | | | | | i : t3u | | i : t3u | | | |
| | | 01010 | | | | | sel_RcRc | | | | | |
| | | | | | | | s1 : mRc | | dst : mRc | | | |
| | | | | | | | i : t3u | | i : t3u | | | |
| | | 001 | | | mv_RcR | | | | | | | |
| | | | | op : xtwl_op | s1 : mR | | | | dst : mRc | | | |
| | | | | 0 xts | mRr | | | | i : t3u | | | |
| | | | | 1 xtz | 0 | i : t3u | | | | | | |
| | | | | | mRi | | | | | | | |
| | | | | | 1 | i : t3u | | | | | | |
| | | 100 | | | mv_RAg | | | | | | | |
| | | | | | s1 : mAguRegs | | | | dst : mR | | | |
| | | | | | e : eAguRegs | | | | mRr | | | |
| | | | | | | | | | 0 | i : t3u | | |
| | | | | | | | | | mRi | | | |
| | | | | | | | | | 1 | i : t3u | | |
| | | 110 | | | mv_AgR | | | | | | | |
| | | | | | src : mR | | | | dst : mAguRegs | | | |
| | | | | | mRr | | | | e : eAguRegs | | | |
| | | | | | mRi | | | | | | | |
| | | 101 | | | sel_mv_RAg | | | | | | | |
| | | | | | s1 : mAguRegs | | | | dst : mR | | | |
| | | | | | e : eAguRegs | | | | mRr | | | |
| | | | | | | | | | mRi | | | |

| 19 | 20 | 21 | 22 | 23 | 24 | 25 | 26 | 27 | 28 | 29 | 30 | 31 |
|---|---|---|---|---|---|---|---|---|---|---|---|---|
| | | | | | 001 | | | | mv_RcR | | | |
| | | | | | op : xtwl_op | | s1 : mR | | | dst : mRc | | |
| | | | | | 0 xts | | mRr | | | i : t3u | | |
| | | | | | 1 xtz | 0 | | i : t3u | | | | |
| | | | | | | | mRi | | | | | |
| | | | | | | 1 | | i : t3u | | | | |
| | | | | | 100 | | | | mv_RAg | | | |
| | | | | | s1 : mAguRegs | | | | dst : mR | | | |
| | | | | | e : eAguRegs | | | | mRr | | | |
| | | | | | | | | | 0 | | i : t3u | |
| | | | | | | | | | mRi | | | |
| | | | | | | | | | 1 | | i : t3u | |
| | | | | | 110 | | | | mv_AgR | | | |
| | | | | | src : mR | | | | dst : mAguRegs | | | |
| | | | | | mRr | | | | e : eAguRegs | | | |
| | | | | | mRi | | | | | | | |
| | | | | | 101 | | | | sel_mv_RAg | | | |
| | | | | | s1 : mAguRegs | | | | dst : mR | | | |
| | | | | | e : eAguRegs | | | | mRr | | | |
| | | | | | | | | | mRi | | | |
| | | | | 1110 | | | | | mv_LcR | | | |
| | | | | | | src : mR | | | dst : mLcRegs | | | |
| | | | | | | mRr | | | e : eLcRegs | | | |
| | | | | | | 0 | | i : t3u | | 000 Cnt | | |
| | | | | | | mRi | | | | 001 LP | | |
| | | | | | | 1 | | i : t3u | | 010 LC0 | | |
| | | | | | | | | | | 011 LS0 | | |
| | | | | | | | | | | 100 LE0 | | |
| | | | | | | | | | | 101 LC1 | | |
| | | | | | | | | | | 110 LS1 | | |
| | | | | | | | | | | 111 LE1 | | |
| | | | | | | | | | mv_RLc | | | |
| | | | | 1111 | | | s1 : mLcRegs | | | dst : mR | | |
| | | | | | | | e : eLcRegs | | | mRr | | |
| | | | | | | | | | | mRi | | |

| 19 | 20 | 21 | 22 | 23 | 24 | 25 | 26 | 27 | 28 | 29 | 30 | 31 |
|----|----|----|----|----|----|----|----|----|----|----|----|----|
|  |  | 1111 |  |  |  |  |  |  | mv_RLc ||||
|  |  |  |  |  |  | s1 : mLcRegs ||| dst : mR |||
|  |  |  |  |  |  | e : eLcRegs ||| mRr |||
|  |  |  |  |  |  |  |  |  | mRi |||
|  |  | 0100100 |||||||  mv_PAg ||||
|  |  |  |  |  |  |  |  |  | src : mAgPPRegs || dst : mPpAgRegs ||
|  |  |  |  |  |  |  |  |  | mPM || e : ePpAgRegs ||
|  |  |  |  |  |  |  |  |  | i : t2u || 00  PPSrcL0 ||
|  |  |  |  |  |  |  |  |  |  |  | 01  PPSrcL1 ||
|  |  |  |  |  |  |  |  |  |  |  | 10  PPSPL ||
|  |  | 0100101 |||||||  mv_AgP ||||
|  |  |  |  |  |  |  |  |  | src : mPpAgRegs || dst : mAgPPRegs ||
|  |  |  |  |  |  |  |  |  | e : ePpAgRegs || mPM ||
|  |  |  |  |  |  |  |  |  | 00  PPSrcL0 || i : t2u ||
|  |  |  |  |  |  |  |  |  | 01  PPSrcL1 ||  ||
|  |  |  |  |  |  |  |  |  | 10  PPSPL ||  ||
|  |  | 0100110 |||||||  mv_PRc ||||
|  |  |  |  |  |  |  |  |  | src : mRcId | dst : mPpRegs ||||
|  |  |  |  |  |  |  |  |  | ld0_reg | e : ePpRegs ||||
|  |  |  |  |  |  |  |  |  | 0 | 000  PPSrc0 ||||
|  |  |  |  |  |  |  |  |  | ld1_reg | 001  PPSrc1 ||||
|  |  |  |  |  |  |  |  |  | 1 | 010  PPDst ||||
|  |  |  |  |  |  |  |  |  |  | 011  PPSP ||||
|  |  |  |  |  |  |  |  |  |  | 100  PPCmdCtrl ||||
|  |  |  |  |  |  |  |  |  |  | 101  PPStatus ||||
|  |  |  |  |  |  |  |  |  |  | 110  PPClkCtrl ||||
|  |  | 0100111 |||||||  mv_RcP ||||
|  |  |  |  |  |  |  |  |  | src : mPpRegs ||| dst : mRcSt |
|  |  |  |  |  |  |  |  |  | e : ePpRegs ||| st0_reg |
|  |  |  |  |  |  |  |  |  | 000  PPSrc0 ||| 0 |
|  |  |  |  |  |  |  |  |  | 001  PPSrc1 ||| st1_reg |
|  |  |  |  |  |  |  |  |  | 010  PPDst ||| 1 |
|  |  |  |  |  |  |  |  |  | 011  PPSP ||||
|  |  |  |  |  |  |  |  |  | 100  PPCmdCtrl ||||
|  |  |  |  |  |  |  |  |  | 101  PPStatus ||||
|  |  |  |  |  |  |  |  |  | 110  PPClkCtrl ||||
|  | nop ||||||||||||
|  | 11111111111 ||||||||||||

| bits | | |
|---|---|---|
| 0 1 2 3 4 5 6 7 8 9 10 11 12 13 14 15 16 17 18 19 20 21 22 23 24 25 26 27 28 29 / 30 / 31 | | |

| | | | | | |
|---|---|---|---|---|---|
| 10101xxxxxxxxxxxxxxxxxxxxxxxx | | | | smr_lrshift | |
| | | | | 0 | lshift |
| | | | | sd : mSM | sf : shift factor |
| | | | | e : eSM | e : eShift |
| | | | | 0 sa0 | 0 one |
| | | | | 1 ma | 1 two |
| | | | | 1 | rshift |
| | | | | sd : mSr | sf : shift_factor |
| | | | | e : eSr | e : eShift |
| | | | | 0 sr | 0 one |
| | | | | 1 sr2 | 1 two |
| 1000xxx | | ld imm | | | |
| | 00xxx | load_imm | | | |
| | | d : mAguRegs | imm : word16 | | |
| | | e : eAguRegs | | | |
| | 01xxx | load Rimm | | | |
| | | d : mR | imm : word16 | | |
| | | mRr | | | |
| | | 0 | i : t3u | | |
| | | mRi | | | |
| | | 1 | i : t3u | | |
| | 10xxx | load zero | | | |
| | | 0 | d : mRc | 0000000000000000 | |
| | | | i : t3u | | |
| | 11xxxxxxx | load_cnt | | | |
| | | imm : word16 | | | |
| | ls sp off | | | | |
| 1001xxx | 00xxx | load R sp idx imm | | | |
| | | d : mR | 0000000000 | offs : t6u | |
| | | mRr | | | |
| | | mRi | | | |
| | 01xxx | store R sp idx imm | | | |
| | | s : mR | 0000000000 | offs : t6u | |
| | | mRr | | | |
| | | mRi | | | |
| | 10xxxx | load_Rc_sp_idx imm | | | |
| | | d : mRc | 0000000000 | offs : t6u | |
| | | i : t3u | | | |
| | 11xxxx | store Rc sp idx imm | | | |
| | | s : mRc | 0000000000 | offs : t6u | |
| | | i : t3u | | | |
| | 10100xxxxxxxxxxx | add_imm_SP | | | |
| | | offs : word16 | | | |
| 1011xxx | | pc dcnt | | | |
| | 00xxxxxxx | doloop | | | |
| | | end : word16 | | | |
| | return | | | | |
| | 01xxxxxxxxxxxxxxxxxxxxxx | | | | |
| | reti | | | | |
| | 10xxxxxxxxxxxxxxxxxxxxxx | | | | |

LOW ENERGY ACCELERATOR PROCESSOR ARCHITECTURE WITH SHORT PARALLEL INSTRUCTION WORD AND NON-ORTHOGONAL REGISTER DATA FILE

CROSS-REFERENCE TO RELATED APPLICATIONS

The present application is related to U.S. patent application Ser. No. 14/678,939, entitled "LOW ENERGY ACCELERATOR PROCESSOR ARCHITECTURE WITH SHORT PARALLEL INSTRUCTION WORD," which was filed contemporaneously with the present application, and which is hereby incorporated by reference herein in its entirety.

TECHNICAL FIELD

The present application relates to microprocessors such as are used for control systems and for applications with processing data from sensors, and in particular to the use of microprocessor units (MPUs) in control applications where lower power consumption is of particular importance, such as in portable battery powered devices. Mobile telecommunications, industrial control, automotive, and cellular applications are example applications for these microprocessor units, which, when used in control applications are referred to as "microcontrollers" or "MCUs." In particular, the present application relates to the use of microcontrollers including a low energy accelerator processor for accelerating commonly performed vector operations with a lower power consumption.

BACKGROUND

Microcontroller units (MCUs) are increasingly used in systems for providing automated control and for sensing applications. Example applications for MCUs include industrial controls, metering such as utility and network metering, medical instruments and medical technologies, automotive applications, telecommunications including cellular base stations, and use on a variety of portable computing platforms including tablet computers, smart watches, smart phones, and the like. Additional applications include remote sensing and equipment monitoring, RF tag sensing such as used in toll systems, retail security and asset location, and in enabling "Internet of Things" or "IoT" applications. Demand for portable and battery powered implementations for MCUs are increasing. Because these applications often require receiving analog signals as inputs from sensing devices, mixed signal processors (MSPs) have also been introduced. Prior known MSP devices often include embedded analog to digital converters and analog comparison functions along with microprocessor units. The analog circuitry is used to receive analog input signals and to convert these to digital representations for use in performing computations. Additional example analog sensors include pressure, temperature, speed and rotation sensors, gyroscopes, accelerometers, optical sensors and the like.

While embedded microprocessors are currently used in MCUs and MSPs to perform various functions, these devices are increasingly used in applications where both stand-by and active device power consumption are of great importance. While adding functionality to increase computational performance is always desirable, and demand for these added computation features is always increasing, the need for reduced power consumption is also increasing. Reducing power consumption results in longer battery life, extending time between battery charges or between battery replacements, and increases the time between needed services of remote sensing equipment, for example. For a portable consumer device, a battery life of at least one day in very active use is particularly desirable so that the consumer does not have to find a charging location while using the device away from home or office locations, for example.

Data processing tasks that are commonly performed by such mixed signal control and sensing devices typically include vector operations. Vector operations are often used in signal processing applications. Typical operations using vector computations include Fourier transforms such as Fast Fourier Transforms (FFT), Finite Impulse Response filtering (FIR), Infinite Impulse Response (IIR), cryptanalysis computations, and similar vector functions. While the microprocessor embedded within a microcontroller device needs to be able to perform general processing computing functions such as controlling memory accesses, data input and output functions, display and user input, communications, data transmission and the like, the need for performing these vector arithmetic functions creates a challenge for efficient computation in most general purpose microprocessors. In order to achieve high computation performance for these vector operations, a variety of prior known approaches have been used. In one approach, a digital signal processor (DSP) can be added to an integrated circuit MCU or to an integrated circuit or module that includes a microprocessor unit. While the added DSP can efficiently perform certain signal processing functions such as vector operations much faster than can be achieved by using software running instructions on the MPU, the added DSP also substantially increases the number of transistors (gate count) and silicon area used to implement the microcontroller device, and the corresponding costs for device production also rise. Further the addition of a DSP to a microcontroller device adds additional functionality and increases silicon area for certain features of the DSP which are not necessary just for performing the vector operations. In addition, because for CMOS semiconductor technology currently in use, in CMOS integrated circuit devices the power consumed is roughly directly proportional to the number of transistors (or gates) on the device, active device power consumption tends to increase in roughly direct proportion with device performance when this approach is used. This is problematic for any integrated circuit design and is particularly undesirable for the applications considered here, where in fact a substantial decrease in power consumption is needed.

Additional prior known approaches include the use of dedicated hardware accelerators specifically designed to perform certain vector operations. While performance will be increased using these dedicated hardware accelerators for each vector operation to be computed, this approach also tends to increase silicon area as a separate hardware function is added for each type of vector computation to be accelerated. Further the time to market and integrated circuit design process can be quite lengthy when using a dedicated hardware solution, as the dedicated hardware needs to be changed to address different applications. While computational performance will be increased when a dedicated hardware block is used to execute certain vector computations, the disadvantages of non-flexibility and an inability to modify the computations outweigh the potential benefits. Further dedicated hardware accelerators are not used for operations other than the particular dedicated function are being performed, so the integrated circuit designs with dedicated hardware accelerators can be an inefficient use of silicon area, depending on how often the particular function is performed.

A continuing and increasing need thus exists for an accelerator processor architecture that is compatible with current and future CMOS integrated circuit technology, which is optimized for commonly used vector arithmetic operations, and which provides excellent computational performance with reduced silicon area and reduced gate count and correspondingly, exhibits reduced power consumption when compared to the prior known solutions.

SUMMARY

In the arrangements that form various aspects of the present application, an accelerator processor architecture with a non-orthogonal data register file, a non-orthogonal address register set, and an optimized instruction set is provided that overcomes the deficiencies and disadvantages of the prior known approaches. The novel microprocessor uses a short parallel instruction word architecture with an optimized instruction set to achieve high computational performance, and the use of a non-orthogonal data register file and non-orthogonal address registers provides an accelerator processor with reduced power consumption.

In an illustrative arrangement that forms an aspect of the present application, an integrated circuit includes a system bus for transferring data between memory devices, processors, and peripheral devices having a data width N, where N is a positive integer; a central processor unit coupled to the system bus and configured to execute instructions retrieved from a memory coupled to the system bus; a low energy accelerator processor coupled to the system bus and configured to execute instruction words retrieved from a low energy accelerator code memory coupled to the system bus, the low energy accelerator processor having a plurality of execution units including a load store unit, a load coefficient unit, a multiply unit, and a butterfly/adder ALU unit, each of the execution units configured to perform operations responsive to op-codes decoded from the retrieved instruction words, wherein the width of the instruction words is equal to the data width N of the system bus; and a non-orthogonal data register file comprising a set of data registers coupled to the plurality of execution units, the registers coupled to selected ones of the plurality of execution units being less than all of the data registers in the data register file.

In an additional arrangement, the integrated circuit described above includes wherein the butterfly/adder ALU unit of the low energy accelerator processor is configured to use any one of the registers in the data register file as a source register for an operation of the ALU, and is further configured to use any one of the registers in the data register file as a destination register for the operation.

In still a further arrangement, in the integrated circuit described above, wherein the load coefficient unit of the low energy accelerator processor is configured to use only one of the registers of the data register file as a destination register.

In yet another arrangement, the integrated circuit described above is provided wherein the multiply unit of the low energy accelerator processor is configured to use two of the registers of the data register file as source registers for a multiply operation.

In an alternative arrangement, the integrated circuit described above is provided wherein the multiply unit of the low energy accelerator processor is further configured to use at least two of the registers of the data register as destination registers.

In still another arrangement that forms an additional aspect of the present application, in the integrated circuit described above, the load store unit of the low energy accelerator processor is further configured to use at least two of the registers of the data register file as source registers.

In still a further arrangement, in the above described integrated circuit, the load store unit of the low energy accelerator processor is further configured to use at least four registers of the data register file as destination.

In still a further arrangement, in the above described integrated circuit, the data register file of the low energy accelerator processor comprises eight registers having a width equal to the data width N of the system bus.

In yet another arrangement, in the above described integrated circuit, the eight registers have a data width N is equal to 32 bits.

In still another arrangement, in the above described integrated circuit, the data width N is 32 bits.

In a further alternative arrangement, in the above described integrated circuit, the data width N is 16 bits.

In still another arrangement, in the above described integrated circuit, the data register file is coupled to each of the plurality of execution units in a non-orthogonal architecture so that the source register connections and the destination register connections between each of the execution units and the registers in the data register file are different for each one of the execution units.

In another arrangement that forms an additional aspect of the present application, a data processor includes a system bus coupled to at least one memory and having a data width of N, where N is a positive integer; a central processor unit is coupled to the system bus; a low energy accelerator processor is coupled to the system bus and configured to execute parallel instruction words retrieved from the memory responsive to a memory address from a program controller, wherein the parallel instruction words have a length of less than or equal to N, the data width of the system bus, and further including a load store execution unit configured to load data from a memory location and store the load data to registers in the low energy accelerator processor; a load coefficient execution unit is configured to load a coefficient from a register; a multiply execution unit configured to perform multiply operations on data from registers and store a result in a destination register; a ALU execution unit is configured to perform butterfly and ADD operations on data from registers and store a result in a destination register; a data register file comprises a plurality of data registers of width N, wherein the data register file is coupled to the load store execution unit, the load coefficient execution unit, the multiply execution unit, and the ALU execution unit; the connections between the plurality of data registers in the data register file and the load store execution unit, the load coefficient execution unit, the multiply execution unit, and the ALU execution unit form a non-orthogonal architecture.

In still a further arrangement of the data processor described above, the butterfly/adder ALU unit of the low energy accelerator processor is configured to use any one of the registers in the data register file as a source register for an operation of the ALU, and is further configured to use any one of the registers in the data register file as a destination register for the operation.

In an alternative arrangement of the data processor described above, the load coefficient unit of the low energy accelerator processor is configured to use only one of the registers of the data register file as a destination register.

In still another alternative arrangement of the data processor described above, the multiply unit of the low energy accelerator processor is configured to use two of the registers of the data register file as source registers for a multiply operation and the multiply unit of the low energy accelerator processor is further configured to use at least two of the registers of the data register as destination registers.

In still a further arrangement in the data processor described above the load store unit of the low energy accelerator processor is further configured to use at least two of the registers of the data register file as source registers and the load store unit of the low energy accelerator processor is further configured to use at least four of the data register file as destination registers.

In still another arrangement, arrangement of the data processor described above the data register file of the low energy accelerator processor comprises eight registers having a width equal to the data width N of the system bus.

In still a further alternative arrangement in the data processor above, the data width N is 32 bits.

In still a further alternative arrangement in the data processor above, the load store unit has a set of address registers connected to it, and the load coefficient unit has a separate address register connected to it.

In still a further alternative arrangement in the data processor above, the load store unit has a set of address registers connected to it and a set of step registers connected to it, and the load coefficient unit has a separate address register and a separate step register connected to it.

In yet another arrangement that forms an additional aspect of the present application, a microcontroller unit includes a system bus having a data width of 32; a central processing unit is coupled to the system bus; a low energy accelerator processor is coupled to the system bus and configured to execute short parallel instruction words, and further comprising: a load store execution unit; a load coefficient execution unit; a multiply execution unit; and a butterfly/ADD ALU execution unit; and a non-orthogonal data register file comprising a plurality of data registers coupled to the load store execution unit, load coefficient execution unit, multiply execution unit, and butterfly/ADD ALU execution unit, wherein the data register file is coupled to each one of the execution units in a non-orthogonal architecture so that the source data register connections and the destination data register connections between each of the load store execution unit, load coefficient execution unit, multiply execution unit, and butterfly/ADD ALU execution unit and the data registers in the data register file are different for each execution unit.

Various alternative arrangements that form additional aspects of the present application are also described below which are contemplated by the inventors and which fall within the scope of the appended claims.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 8 depicts in a table a summary of an instruction set architecture arrangement of the present application;

FIG. 9 depicts in another table further details of the instruction set architecture arrangement of the present application;

FIG. 11 depicts in an another table further details of the instruction set architecture arrangement of the present application;

FIG. 12 depicts in an another table further details of the instruction set architecture arrangement of the present application;

FIG. 13 depicts in an another table further details of the instruction set architecture arrangement of the present application;

FIG. 14 depicts in yet another table further details of the instruction set architecture arrangement of the present application;

FIG. 15 depicts in yet another table further details of the instruction set architecture arrangement of the present application;

FIG. 16 depicts in a further table additional details of the instruction set architecture arrangement of the present application; and FIG. 17 depicts in a further table additional details of the instruction set architecture arrangement of the present application.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
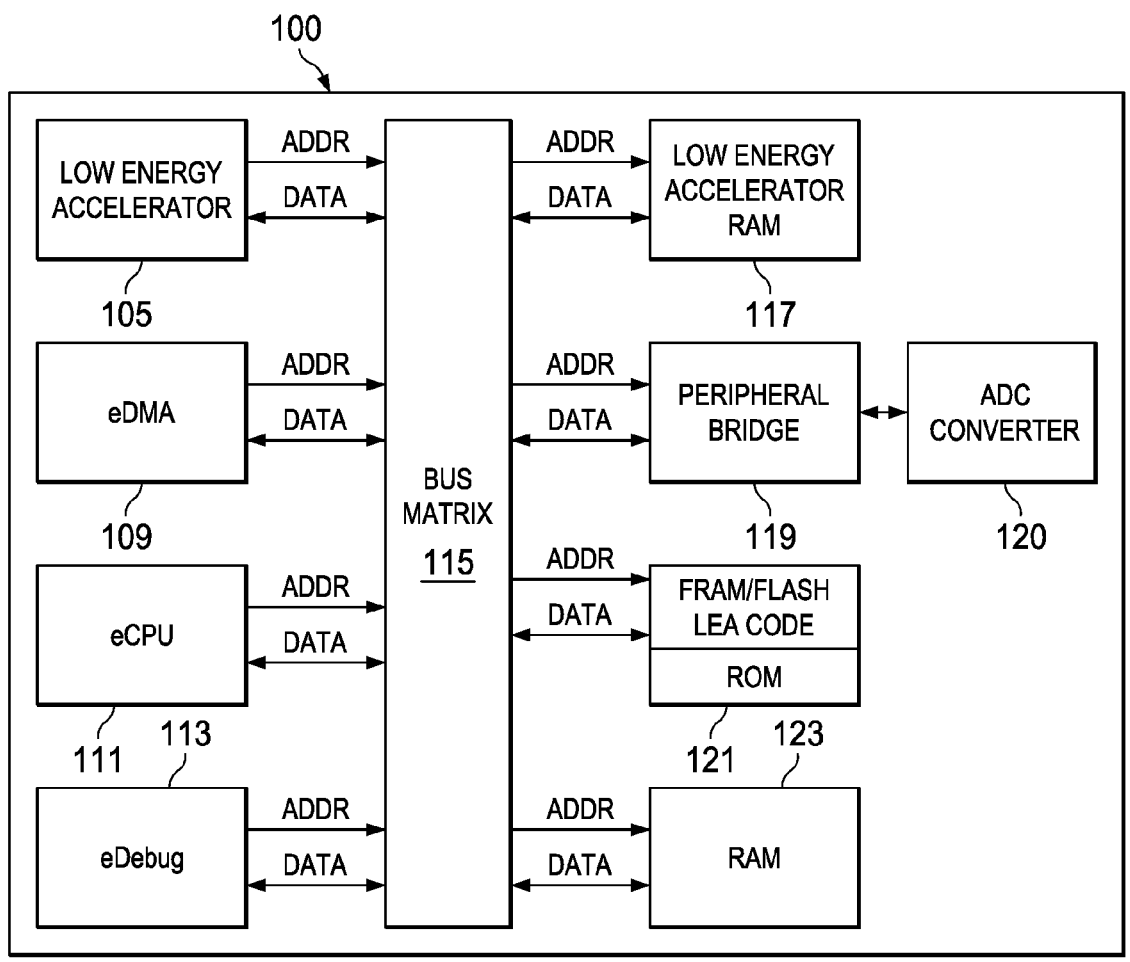
FIG. 1 depicts a block diagram of a processing system including an example low energy accelerator processor of the present application.

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected," the term "coupled" is not to be limited to "connected" or "directly connected" but instead the term "coupled" may include connections made with intervening elements, and additional elements and various connections may be used between any elements that are described as "coupled."

In an aspect of the present application, an application specific integrated processor (ASIP) architecture is provided in the form of a low energy accelerator processor (LEA processor). The LEA processor is optimized for vector computations and arranged to require a lower gate count than prior known processor accelerator approaches, and is optimized to provide a lower active power consumption. The arrangements of the accelerator processor include an optimized instruction set and an architecture optimized for selected vector computations. In an example arrangement, the LEA instruction set and an optimized architecture includes a short parallel instruction word (SPIW) having an instruction word length that matches a memory system data bus width, thereby increasing system bus performance and reducing the number of bus driver devices needed to provide a new instruction word for execution on each clock cycle. In an alternative arrangement that forms an additional aspect of the present application, the system bus width can be smaller than the length of the short parallel instruction word and may be half of the length of the short parallel instruction word, so that an instruction word fetch over the system bus would require two memory accesses. In addition the arrangements of the present application incorporate an instruction set architecture (ISA) for the LEA processor that is optimized for selected vector oriented computations such as are used in FFT, FIR and IIR computations, for cryptography, and like operations. In the LEA, address registers and data registers are provided separately. The address registers are arranged in a manner to reduce the connections required, that is, the execution units that have access to the address registers are less than all of the execution units, and the connections are optimized to minimize gate count and silicon area. In an example arrangement, the load store unit has separate address, step and address mask registers connected to it, and the load coefficient unit has a single address register connected to it, while the remaining execution units are not connected to the address registers. The data registers are further arranged in a non-orthogonal data register file in a manner which, in combination with the optimized instruction set architecture, provides support for vector operations yet is implemented with a further reduced gate count and reduced silicon area when compared to fully orthogonal data register files used in prior known processor architectures.

FIG. 1 illustrates, in a simplified block diagram, a microcontroller system that incorporates features of the present application. In system 100, which can be arranged on a single integrated circuit as a "system on an integrated circuit" (SOIC), or which can be arranged in further alternative approaches as a multiple chip module or circuit board. A bus matrix 115 couples various functional blocks to one another. In this example arrangement, LEA processor 105 is coupled to the bus matrix 115 and incorporates the novel features of the present application. In addition, various additional embedded functional units are provided as part of system 100. An embedded central processor unit (eCPU) 111 is provided to perform general computing tasks and to support various input and output functions, memory accesses, data store and retrieval operations, and communications with external devices. An embedded direct memory access (eDMA) function 109 is coupled to the bus matrix 115 and provides a means to access external memory such as DRAM or FLASH storage outside the system 100. A software debug module (eDebug) 113 can be provided and coupled to the bus matrix 115. Memory for use by the LEA 105, for example, embedded RAM such as static RAM (SRAM) or dynamic RAM (DRAM), is provided and labeled Low Energy Accelerator RAM 117. The LEA 105 can use this memory for data storage and for storing intermediate results. Peripheral Bridge unit 119 is arranged to couple various additional peripheral units (not all shown in FIG. 1, for simplicity) to the bus matrix 115 and thus to the eCPU 111, and/or to the LEA 105. In FIG. 1, an example analog-to-digital converter ADC 120 is shown as a peripheral unit coupled to the peripheral bridge unit 119. Additional peripheral units such as bus interface units for test bus, scan bus, USB, and other bus interfaces can be coupled to the Peripheral Bridge 119. In addition, various application specific peripheral units such as analog to digital converters (ADC) 120 as in FIG. 1, digital to analog converters (DAC), embedded or external sensors such as gyroscopes, accelerometers, and position sensors can be coupled to the Peripheral Bridge 119, for example. Radio and wireless communications functions such as WiFi, Bluetooth, NFC, and RF and cellular functions can be embedded as additional peripheral units and coupled to the Peripheral Bridge 119.

In addition, the system 100 can also include non-volatile program storage such as FRAM or FLASH memory for storing code for the LEA in the FRAM/Flash LEA Code block 121, which as shown can also include a portion of read only memory (ROM) containing code used for boot-up or start-up program storage. Finally, additional on-board memory, which can be embedded RAM such as SRAM or DRAM is shown as RAM 123. As described above, in an example arrangement, the system bus has a data width N that is equal to the length of the short parallel instruction word used by the LEA, for example 32 bits. In another example arrangement, the system bus has a data width N that is half of the length of the short parallel instruction word of the LEA, for example the data width N may be 16 bits.

The system or integrated circuit 100 includes many elements that are typical for a micro-processor or micro-controller system. In addition, the system 100 includes the LEA processor 105. As is further described below, the LEA 105 provides a low power, high performance, programmable vector processing unit that can perform various vector computations independently from the eCPU 111, so that the eCPU 111 can perform other typical computing tasks while the LEA 105 simultaneously performs vector computations required for certain applications, thereby providing a high performance vector accelerator for system 100. The system 100 can be considered a micro-controller unit (MCU) or, when analog to digital converter peripherals are included, a mixed signal processor (MSP). The various functional blocks in system 100 can be provided, for example, as embedded functions implemented within a single integrated circuit. However, the arrangements of the present application are not limited to a single integrated circuit implementation, and various alternatives include implementing system 100 using multiple chips in a single package, stacked package modules, package on package modules, multi-chip modules, and circuit boards including memory chips, a CPU, and a LEA 105 that can be fabricated as a standalone dedicated integrated circuit or as application specific integrated circuits (ASICs). The LEA 105 can be provided, in one example arrangement, as a completely parameterized ASIP device core for embedding with other known and complete functional cores such as DSP, ARM, CPU, RISC and the like cores for use in an ASIC device. These and other obvious variations of the example illustrative and non-limiting arrangements that also incorporate novel features that form aspects of the present application are contemplated by the inventors as additional arrangements that fall within the scope of the appended claims.

Figure 2:
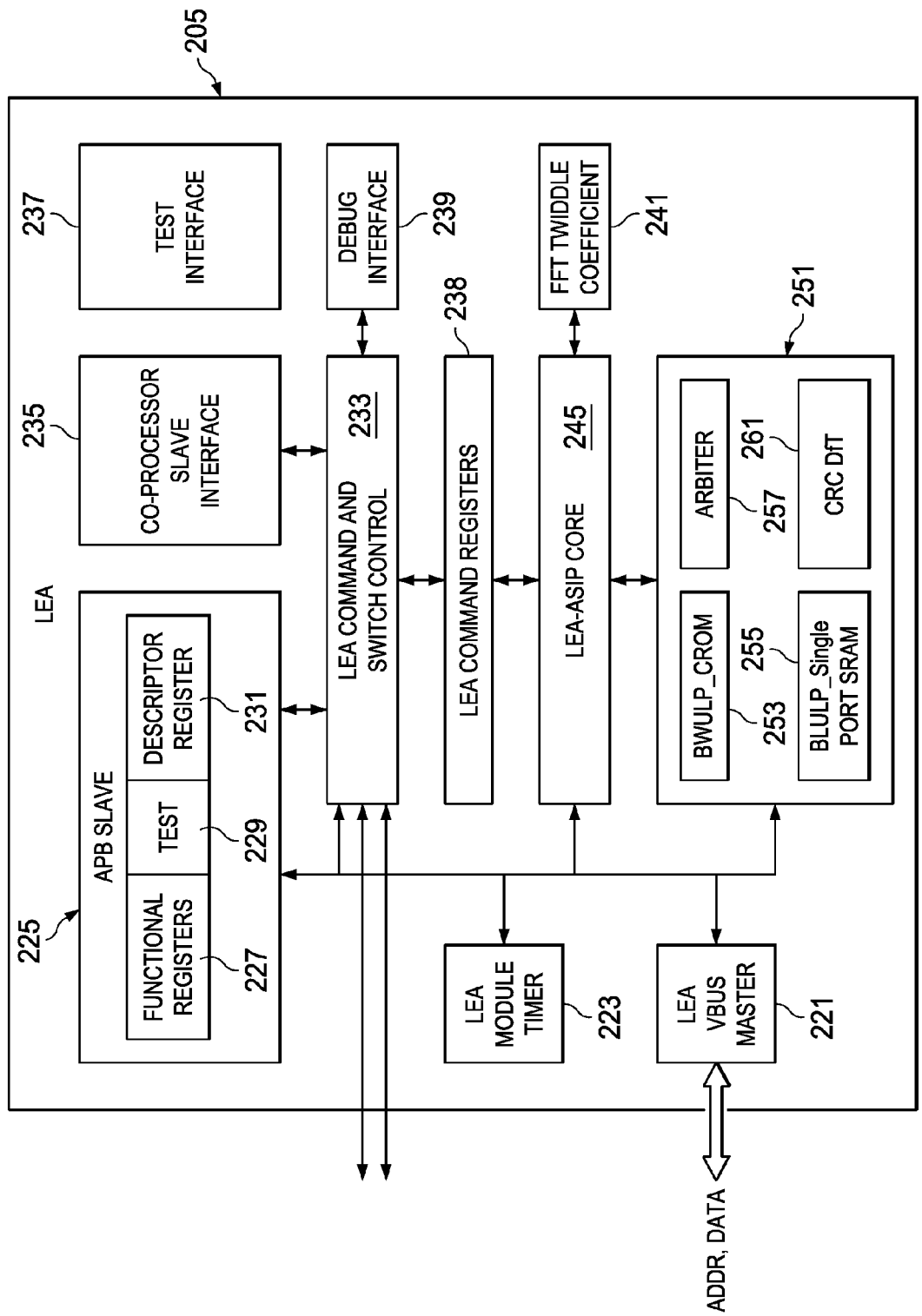
FIG. 2 depicts in a block diagram additional details of the low energy accelerator of the system of FIG. 1.

FIG. 2 depicts in another block diagram an example of the detail of the functional blocks used to implement an LEA such as the LEA 105 in FIG. 1. In FIG. 2, a LEA 205 is shown. A LEA command and switch control block 233 is coupled to a local bus. The local bus is also coupled to an APB Slave function 225 and LEA timer module 223, which is further implemented as a set of functional registers 227, test functions 229 and descriptor register 231. The APB Slave 225 provides an interface to additional peripheral devices on an advanced peripheral bus (APB). A LEA VBUS Master 221 provides an interface to a system bus (such as to the bus matrix 115 of FIG. 1, for example.) A set of LEA command registers 238 is coupled to a LEA-ASIP Core 245. The LEA-ASIP core 245 (ASIP is an abbreviation for Application Specific Integrated Processor) provides the computational core for the LEA 205. A co-processor slave interface 235 couples the LEA to a CPU and allows the LEA to act as a co-processor. The blocks 237 (Test Interface), 239 (Debug Interface), and 241 (FFT Twiddle Coefficient) provide additional interfaces and coefficient data storage for the LEA 205. The block 251 provides code ROM 253, a single port SRAM 255, an arbiter 257, and a cyclic redundancy check CRC/DfT 261 is a design for test or DFT module. The LEA 205 can retrieve instruction words stored in the code ROM 253 and in SRAM 255; that is, the instruction words for the LEA can be stored within the LEA 205 for higher performance, or, can be stored in a memory accessed over the system bus as shown in FIG. 1.

In one example arrangement that forms an aspect of the present application, the LEA 205 can be embedded as a core function in an integrated circuit that forms a system such as 100 in FIG. 1. Alternatively, LEA 205 can be provided as a stand-alone integrated circuit device, or can be packaged with other devices in a multi-chip module, or can be mounted on a circuit board with other components.

In operation, LEA 205 forms a programmable accelerator that is specifically arranged for performing vector computations that are often used in applications with microcontrollers and mixed signal processors. The LEA 205 is arranged to have a small silicon area (low gate count) and to consume low power when compared to prior known solutions. As is further described below, LEA 205 can execute programs using an instruction set tailored to vector operations such as are used for FFTs, FIR, IIR, filtering, vector signal processing and the like.

The LEA ASIP-Core arrangement of the present application provides a processor with four primary execution units or functional units and a program controller to execute instructions in the form of parallel instruction words. As is further described below, a short parallel instruction word (SPIW) arrangement is used. In one arrangement, the use of a short parallel instruction word that is no wider than the width of the memory bus used in the system 100, for example, advantageously reduces the driver devices needed between the memory where the instructions are stored and the LEA ASIP-Core, thus reducing the power consumed for the system busses and allowing a new instruction word to be fetched each cycle, without the need for widening the memory data path. In another alternative arrangement, the system bus data width can be even fewer bits, and the width N can be, for example 16 bits, while the length of the short parallel instruction word for the LEA ASIP Core can be 2N, for example 32 bits. In this example arrangement, the use of the smaller width system data bus saves additional routing and gate area in the silicon, while the smaller system bus data width requires two memory accesses to fetch an instruction word from a memory on the system bus. However, as described above, the instruction words can also be stored locally within the LEA 205 in a code ROM or SRAM memory, in this example arrangement no system bus access is needed to fetch instruction words for the LEA processor.

Because there are 4 functional units arranged with the SPIW to execute an operation for each cycle, the LEA can be referred to as a "4 issue" or "4 slot" architecture. The ISA for the LEA is optimized for both vector computation efficiency and low energy, and is arranged so that the number of gates switching for certain operations is controlled to reduce the active power consumption of the LEA. That is, the device architecture and the ISA are optimized to reduce power consumption. As is further described below, the four functional units are arranged to access a set of registers in a data register file. However, as part of the optimized LEA processor architecture, the four functional units are each allocated access to particular ones, but not all of, the data registers in the data register file. That is, the data register file is arranged as a non-orthogonal register file. Because the interconnections for a fully orthogonal data register file such as are used in prior known devices require a substantial amount of gates and correspondingly, silicon area, the use of the optimized, non-orthogonal data register file substantially reduces the number of gates used, and the silicon area needed. The active power consumption for the LEA processor is also further reduced due to the reduced gate count for the novel Data Register file used in the arrangements.

Further as an additional feature to optimize the gate count and reduce the power consumed by the LEA ASIP Core, separate address registers are provided that are connected only to some, but not all, of the execution units. For example, in one arrangement the load store unit has a set of address registers, a set of step registers and an address mask register, while the load coefficient unit has a separate address register. Connections between the execution units and these separate address registers are chosen to support various vector operations, but the connections are minimized to reduce gate count and silicon area.

Figure 3:
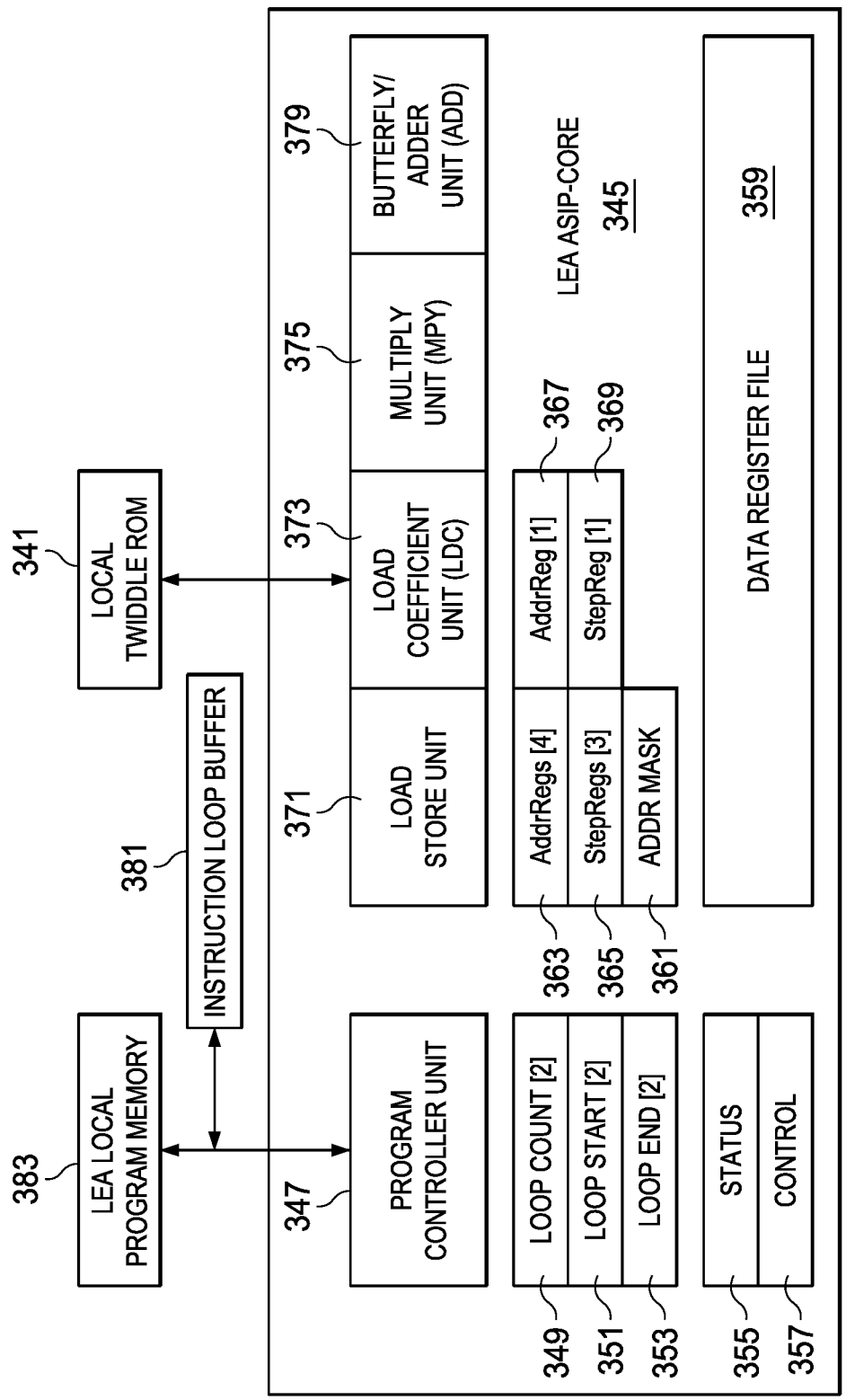
FIG. 3 depicts in a further block diagram the details of a low energy accelerator core of the processor of FIG. 2.

FIG. 3 illustrates in another block diagram additional details for an example ASIP Core implementation to provide the LEA ASIP core such as 245 in FIG. 2. In FIG. 3, LEA ASIP Core 345 is shown in simplified block diagram form.

In FIG. 3, LEA ASIP-Core 345 includes a Program Controller Unit 347. In the example LEA ASIP-Core 345 shown in FIG. 3, two simultaneous execution loops such as an inner do loop and an outer do loop are supported by a pair of loop count registers 349, two loop start registers 351, and two loop end registers 353. Status and control registers for the program controller unit 347 (355, 357 respectively) provide additional resources for the program controller. The LEA ASIP Core 345 can fetch instruction words from a local memory, LEA Local Program Memory 383, and loop execution is further supported by the Instruction Loop Buffer 381.

The four execution units are the Load Store Unit 371, the Load Coefficient Unit 373, the Multiply Unit 375, and the Butterfly/Adder Unit 379, which is an arithmetic logic unit (ALU) arranged to efficiently compute vector operations such as the butterfly computation used in FFT, FIR, IIR and DCT vector operations, for example.

Additional resources provided in the example LEA ASIP-Core 345 includes the four separate address registers 363 coupled to the Load Store Unit 371. Three Step Registers 365, and an Address Mask register 361 are coupled to Load Store Unit 371. In addition, the Load Coefficient Unit 373 is coupled to a separate address register 367, a step register 369, and a Local Twiddle ROM 341, for use in providing constants for certain computations. Note that the remaining execution units, the multiply unit and the butterfly/ADD ALU unit are not connected to these address and step registers. The Data Register File 359 is an important feature of the LEA ASIP-Core 345. In the arrangements for the LEA ASIP-Core, the four functional units—the Load Store Unit 371, the Load Coefficient Unit 373, the Multiply Unit 375, and the Butterfly/Adder Unit 377, are each coupled to certain ones of a set of data registers in the Data Register File, but the four functional units are not each coupled to all of the registers in the Data Register File 359. Instead, and in sharp contrast to the prior known approaches, an optimized design of the Data Register File 359 is used to tailor the physical connections needed between the various execution units and the registers in the Data Register File so as to support the vector operations to be performed with the LEA ASIP-Core 345 with a highly reduced gate count. By reducing the physical connections required (typically implemented as multiplexers and demultiplexers, sometimes referred to as "ports") between the four functional units and the registers in the Data Register File 359, the gate count and silicon area required to fabricate the LEA ASIP-Core 345 is greatly reduced.

The tradeoff for the reduced silicon area and power saving is that the programming flexibility of the LEA ASIP-Core 345 is limited when compared to programming for the prior known approaches, however by providing the novel instruction set architecture (ISA) that is arranged to be optimized for these hardware limitations of the LEA ASIP-Core 345, the LEA can efficiently perform the vector computations needed in many applications even while providing a processor with a greatly reduced gate count and with correspondingly lower power requirements.

Figure 4:
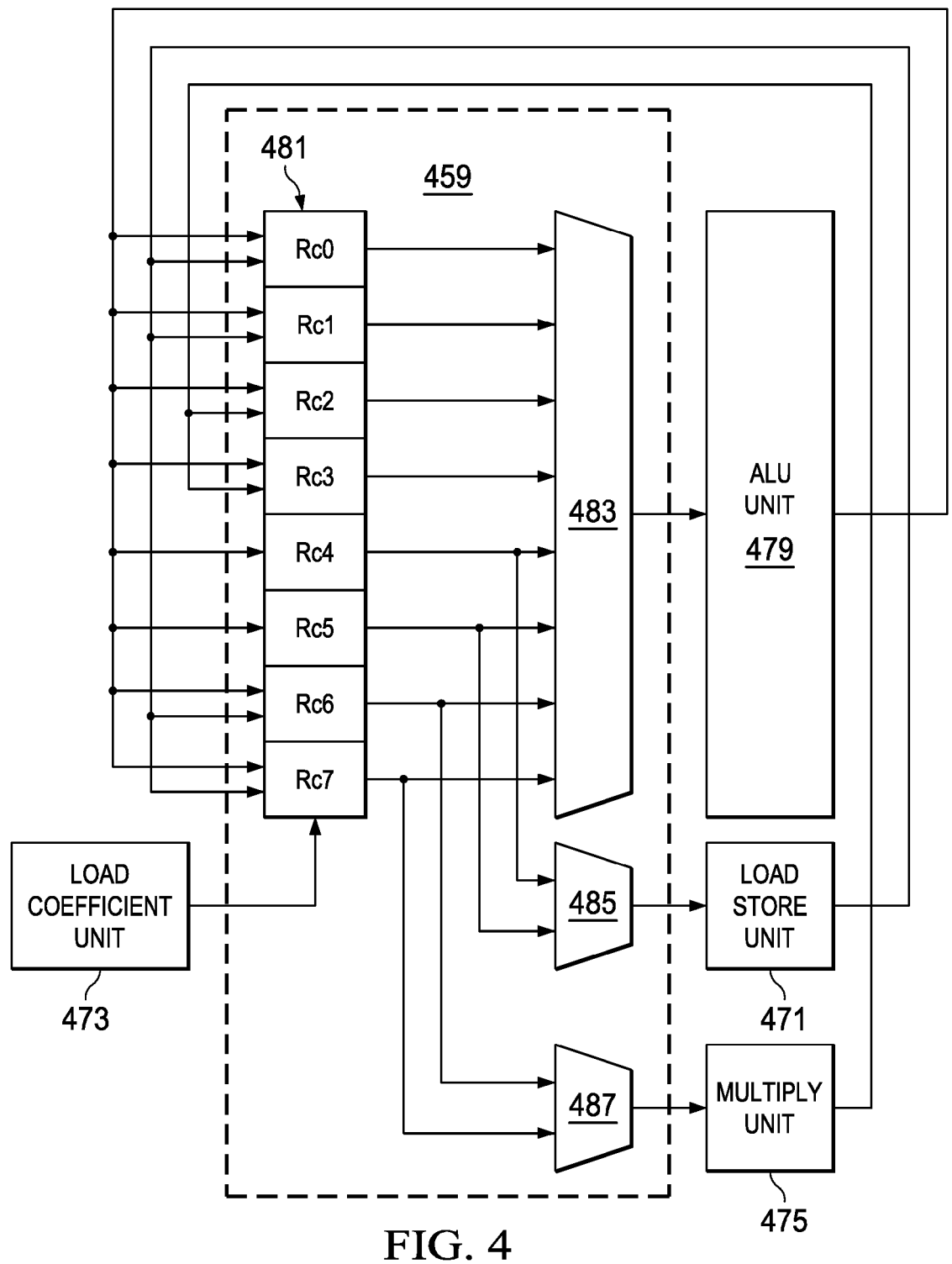
FIG. 4 depicts in another block diagram the details of a data register file arrangement of the present application.

FIG. 4 illustrates in a circuit block diagram the details of an example arrangement for the data register file such as 359 in FIG. 3. In FIG. 4, a data register file 459 is illustrated with a non-orthogonal architecture. The registers 481 are arranged as registers Rc0-Rc7; in an example arrangement, the width of the data registers is the same as an example system bus width, or 32 bits. As described above, in another example, the system bus can be half of the length of the instruction words or 16 bits. In another example arrangement, the data registers can be arranged in 16 registers of 16 bits each. In the example arrangement of FIG.4, the Load Store Unit 471 of the LEA processor core can access just two of the eight registers in the data register file 459 as source registers for load store operations, while the Load Store Unit 471 can access four of the eight registers as destination registers. In this example arrangement, the multiplexer 485 is a 2:1 multiplexer that couples registers Rc4, Rc5 to the Load Store Unit 471. In FIG. 4, the load coefficient functional unit (Load Coeff. Unit 473 in FIG. 4) of the LEA processor core can only access one of the registers (Rc7 in the example of FIG. 4) in the data register file 459. In FIG. 4, the multiply execution unit (Multiply Unit 475 in FIG. 4) can only access registers Rc6, Rc7 as source registers using 2:1 multiplexer 487, and the Multiply Unit 475 has registers Rc2, Rc3 as destination registers. The remaining functional unit of the LEA, ALU Unit 479, is configured to execute butterfly/ADD operations and other ALU operations, and is coupled to all eight of the registers Rc0-Rc7 by an 8:1 multiplexer 483, and as shown in FIG. 4, the ALU 479 is coupled to all eight of the registers in register file 481 as destination registers. Thus the ALU 479 can access any of the registers in the register file 481.

While in this example certain registers are connected to the particular execution units, in various alternative arrangements, a different set of registers can be connected or different register numbering can be used, these various alternative arrangements are also contemplated by the inventors as forming additional aspects of the present application. The advantages of the arrangements result from the data register file being arranged in a non-orthogonal architecture so that the connections between the data registers and the execution units are reduced in terms of gate count and silicon area over a fully orthogonal data register file architecture, but the selection of particular numbered registers to couple to the execution units can be varied while still forming an arrangement that is an aspect of the present application and which falls within the scope of the appended claims.

Figure 5:
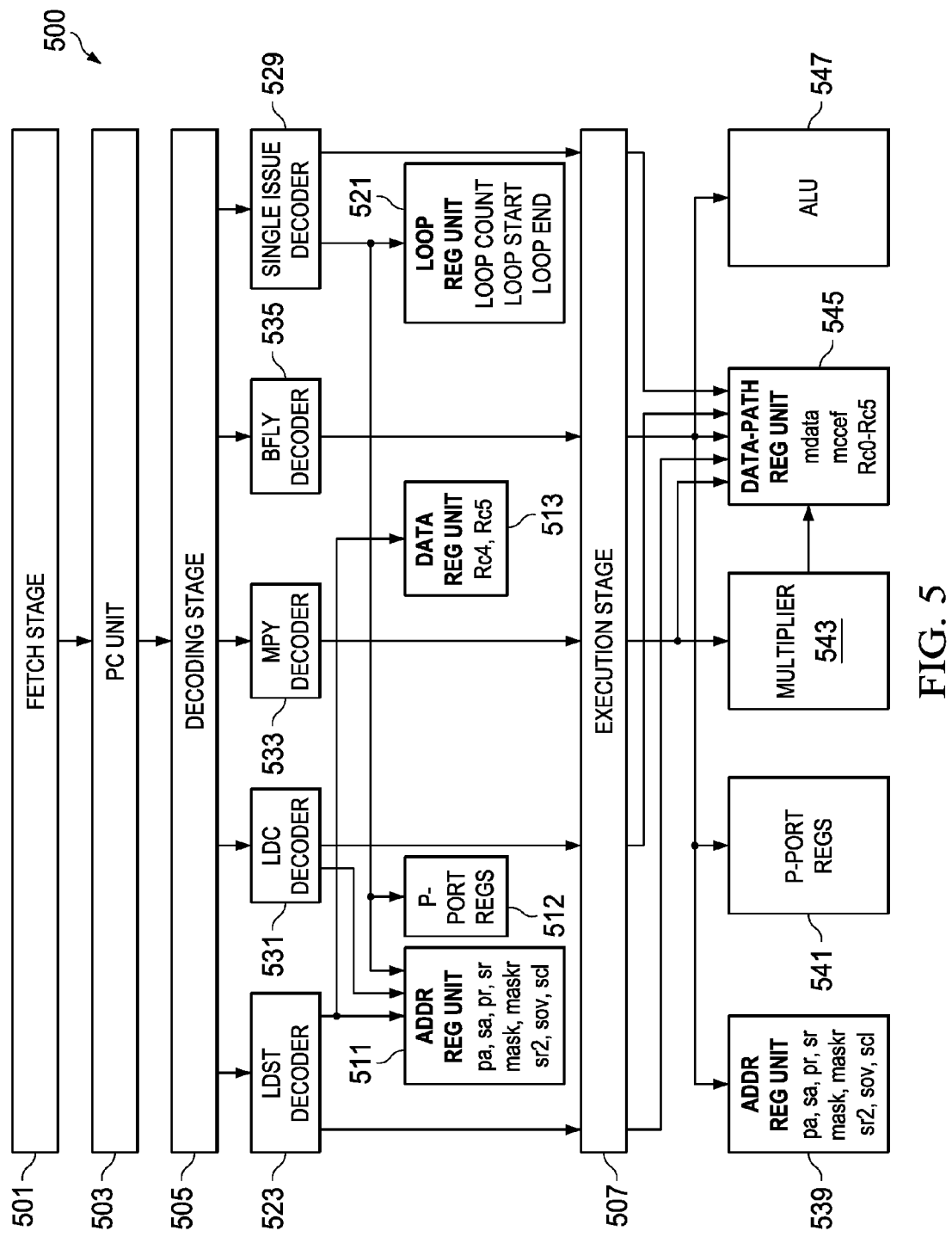
FIG. 5 depicts in a program execution diagram the instruction execution stages for an example arrangement of the present application.

FIG. 5 illustrates an example program execution pipeline diagram for the low energy accelerator processor of the various arrangements that form aspects of the present application. In the non-limiting execution pipeline example shown in FIG. 5, the execution pipeline 500 begins with an instruction fetch operation 501, the fetch operation being controlled by the program controller unit shown as 503 in this example. The fetch operation is followed by an instruction word decoding stage 505. During the decoding stage 505, the instruction word retrieved by the program controller unit 503 at the previous instruction fetch stage 501 is decoded by decoding units that correspond to the various execution units of the low energy accelerator core. For example, a load store decoder labeled "ldst decoder" 523 decodes a portion of the instruction word that provides an op-code for the load store unit. Similarly, a load coefficient decoder labeled "ldc decoder" 531 decodes a portion of the instruction word at the decoding stage 505 that provides an op-code for the load coefficient unit. A decoder labeled "mpy decoder" 533 decodes a portion of the instruction word at the decoding stage 505 that provides an op-code for the multiplier execution unit. A decoder labeled "bfly decoder" 535 also decodes another portion of the instruction word at the decoding stage 505 that provides an op-code for the butterfly/ADD execution unit, which is an ALU. An additional decoder labeled "single issue decoder" 529 decodes a portion of the instruction word at the decoding stage 505 that corresponds to the looping and program counter functions supported by the program control unit 503.

These decodes can be used to set up operations that will be executed by the LEA at the execution stage 507 by units such as the ADDR Reg. Unit 511, the peripheral port register unit 512, the data path register unit 513 and the loop register unit 521 that are shown coupled to the decoders.

An execution stage 507 in the program execution diagram of FIG. 5 illustrates the execution of the previously decoded instruction word by the execution units of the LEA, following the decoding stage 505. During the execution stage 507, the execution units of the LEA perform in parallel the indicated operation according to the op-codes decoded from the instruction word at decoding stage 505.

Because the LEA instruction execution is pipelined, a new instruction word can be executed each cycle. The fetch stage 501, the decoding stage 505, and the execution stage 507 each operate every machine cycle so that the LEA performs a new operation corresponding to a new instruction word during each machine cycle. The machine cycle can correspond to a single system clock cycle, in some arrangements. In other arrangements the machine cycle can correspond to a divided down clock cycle. As is known to those skilled in the art, for CMOS technology integrated circuits where power consumption is roughly directly proportional to switching speed, a reduced clock speed can be used in some non-critical operations to further reduce power consumption. For highest computation performance the execution pipeline would be clocked so that a new instruction word is fetched for each clock cycle.

At the execution stage 507, the decoded instruction word op-codes can control the operations performed by the LEA functional units and other hardware resources including, in the example of FIG. 5, the address registers labeled "ADDR. Reg. Unit" 539, the Peripheral Port Registers "P-Port Regs" labeled 541, the Multiplier 543, the DATA-PATH Reg. Unit numbered 545, and the ALU 547.

In an additional arrangement that provides an additional aspect of the present application, an operand overload register is provided to support floating point operations. In this arrangement, the instruction set architecture (ISA) and the instruction word lengths can be re-used from the fixed point arrangement. Many instructions developed for the fixed point LEA processor described above can be used with this additional arrangement without modification. In another arrangement that forms an additional aspect of the present application, a floating point operand overload flag is used to indicate when a floating point operation is to be performed instead of a fixed point operation. The operand overload flag is coupled to the functional units, the multiplier and the butterfly/ADD ALU functional units, that can perform either floating point or fixed point computations. This operand overload approach advantageously allows re-use of most of the LEA code developed for fixed point computations, reducing the amount of code development needed to implement the additional floating point instructions.

Figure 6:
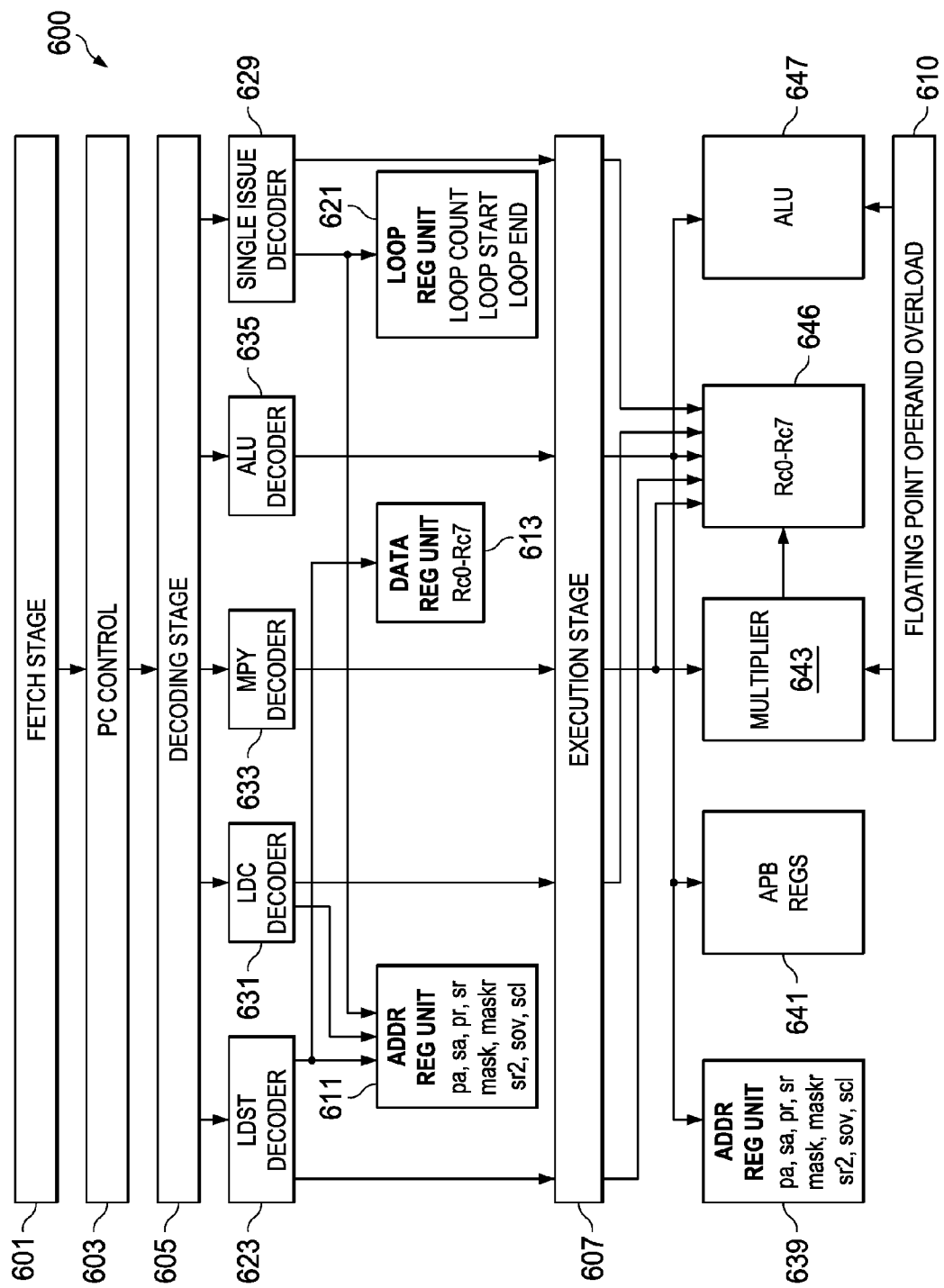
FIG. 6 depicts in another program execution diagram the instruction execution stages for an alternative example arrangement of the present application.

FIG. 6 illustrates the instruction execution pipeline diagram for the example floating point LEA processor core. In most respects the execution pipeline diagram of FIG. 6 is the same as that of FIG. 5, for fixed point computations. In FIG. 6, pipeline 600 includes a fetch stage 601 for fetching a new instruction word from a memory, a PC Controller 603 determining the instruction to be fetched. The instruction word is then moved to the decoding stage 605. Decoders associated with the functional units decode the instruction word to provide op-codes for the four functional units at the decoding stage 605. A load store decoder labeled "ldst decoder" and numbered 623 in FIG. 6 decodes the bits in the instruction word that correspond to the load store unit. A load coefficient decoder labeled "ldc decoder" and numbered 631 decodes the bit (in the ISA examples herein a single bit of the instruction word provides the ldc opcode) for the load coefficient unit. A multiply decoder labeled "mpy decoder" and numbered 633 decodes the bits in the instruction word that correspond to the opcode for the multiplier functional unit. In addition, in this arrangement for the LEA, the multiplier receives the floating point operand overload from the flag 610 labeled "floating point operand overload" and this flag indicates when a floating point, or a fixed point, computation is to be performed. An ALU decoder 635 decodes the portion of the instruction word that corresponds to the butterfly/Adder ALU, and in addition the ALU decoder receives the floating point operand overload from the flag 610 labeled "floating point operand overload" and this flag indicates when a floating point, or a fixed point, computation is to be performed. Also, a single issue decoder 629 decodes the bits in the instruction word that correspond to program control operations such as loop count, return, etc. and the loop functions are updated using that information at the loop register unit 621.

Figure 7:
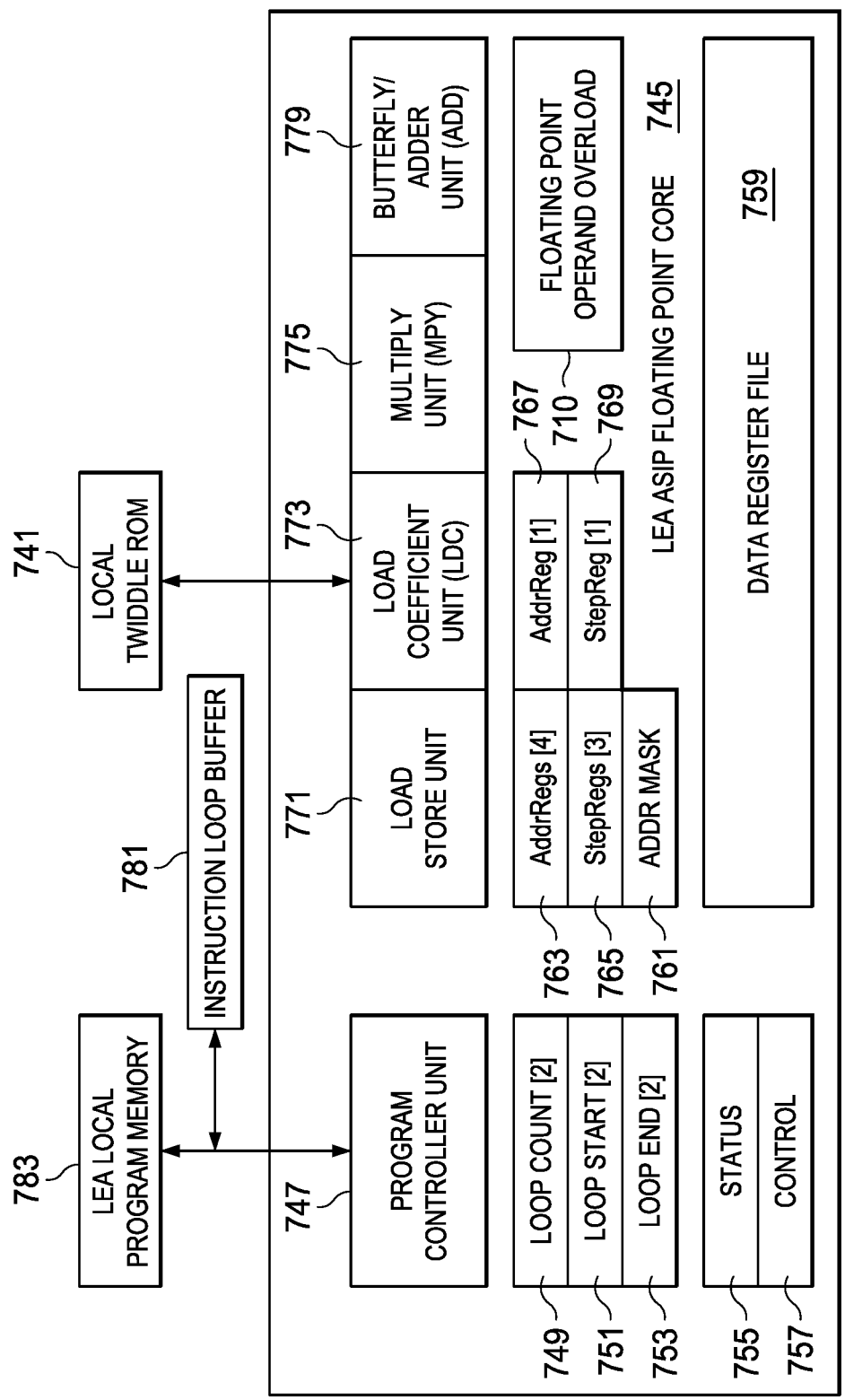
FIG. 7 depicts in a further block diagram an alternative low energy accelerator core arrangement of the present application.

FIG. 7 illustrates in another block diagram additional details for an example ASIP Core implementation to provide the LEA ASIP Core and including floating point capability. In FIG. 7, the block diagram is similar to the LEA ASIP Core 345 of FIG. 3, but includes floating point capability. In FIG.7, LEA ASIP Core 745 is shown in simplified block diagram form.

In FIG. 7, LEA ASIP-Core 745 includes a Program Controller Unit 747. In the example LEA ASIP-Core 745 shown in FIG. 7, two simultaneous execution loops such as an inner do loop and an outer do loop are supported by a pair of loop count registers 749, two loop start registers 751, and two loop end registers 753. Status and control registers for the program controller unit (755, 757 respectively) provide additional resources for the program controller. As described above with respect to the example LEA of FIG. 3, the LEA 745 can fetch instruction words from a local memory, LEA Local Program Memory 783, and loop execution is further supported by the Instruction Loop Buffer 781.

The four execution units are the Load Store Unit 771, the Load Coefficient Unit 773, the Multiply Unit 775, and the Butterfly/Adder Unit 779, which is an arithmetic logic unit (ALU) arranged to efficiently compute vector operations such as the butterfly computation used in FFT, FIR, IIR and DCT vector operations, for example.

LEA ASIP-Core 745 includes four separate address registers 763 coupled to the Load Store Unit 771, three Step Registers 765, and an Address Mask register 761 are coupled to Load Store Unit 771. In addition, the Load Coefficient Unit 773 is coupled to a separate address register 767, a step register 769, and a Local Twiddle ROM 741, for use in providing constants for certain computations. The Data Register File 759 is an important feature of the LEA ASIP-Core 745. As described above, in the arrangements for the LEA ASIP-Core, the four functional units—the Load Store Unit 771, the Load Coefficient Unit 773, the Multiply Unit 775, and the Butterfly/Adder Unit 779, are each coupled to certain ones of a set of data registers in the Data Register File 759. In an example arrangement, the Data Register File is arranged as 8 32-bit wide registers Rc0-Rc7. In an alternative arrangement that is also contemplated as forming an additional aspect of the present application, the data register file can be arranged as 16 16-bit wide registers, for example. As described above, an important feature of the LEA ASIP Core is that the Data Register File is optimized for a reduced gate count and thus, lower power consumption.

The tradeoff for the reduced silicon area and the corresponding power savings is that the programming flexibility of the LEA ASIP-Core is limited (the programming is less flexible when compared to the prior known approaches), however by providing the novel instruction set architecture (ISA) that is arranged to be optimized for these hardware limitations of the LEA ASIP Floating Point Core 745, the LEA can still efficiently perform the vector computations needed in many applications even while providing a processor with a greatly reduced gate count and with correspondingly lower power requirements.

In using the LEA Core, the reduced programming flexibility that occurs due to the optimized data register file design and the short parallel instruction word is easily addressed by developing prewritten code for a wide variety of vector operations which can be re-used and which can be supplied already stored in the LEA Code memory. In this feature of the arrangements, a user of the LEA processor is not impacted by the additional constraints on the programming of the LEA Core, because the user can rely on previously developed and verified code programs for the common vector operations. The LEA Core can therefore be rapidly applied to a particular customer application without the need to rewrite code or to develop new code.

Although the LEA instruction word is relatively short in the arrangements that form various aspects of the present application, in another feature of the arrangements, the instruction set architecture, and the hardware blocks of the LEA of the present application, are yet still arranged to efficiently perform vector operations that are often required by a mixed signal processor or micro-controller unit. By optimizing the instruction set architecture for the particular features of the LEA core, an efficient vector computation accelerator processor is achieved. In contrast to a dedicated hardware accelerator of the prior known approach, the LEA core processor arrangements of the present application are programmable and can perform a variety of vector operations. Using a compiler and a library of code macros, a variety of vector computation programs such as FFT, DFT, DCT, FIR, and the like can be provided already completed for use with the LEA to enable rapid development of application code. Further, and unlike the dedicated hardware accelerators of the known prior solutions, in the novel arrangements of the present application the code used to cause the LEA core processor to perform these vector operations flexible and can be altered after an integrated circuit device including the LEA core processor is manufactured, so the devices are "future proofed," and the operation of the devices can be altered in the field or after production, reducing the costs for improvements or modifications that may be needed later.

FIG. 8 depicts in a combined chart a summary of an example instruction set architecture (ISA) for an LEA processor arrangement that forms an additional aspect of the present application. In FIG. 8, the instruction set architecture is shown in chart 800 using an example 32 bit instruction word width. Because the instruction word width is relatively short at 32 bits, the instruction word can be transmitted from a local memory store such as a code ROM or a RAM or FLASH location using the system data bus width and without the need for a wider bus, and thus without the need for additional driver devices and power to supply the drivers for a wider instruction word. In contrast to the very long instruction word (VLIW) architectures of the prior known approaches, which can use an instruction word that is 64, 128 or even 256 bits wide, the arrangements for the low energy accelerator use, in this example, only 32 bits are used. Matching the instruction short parallel instruction word width to the memory bus width results in substantial reduction in the silicon area required and a corresponding reduction in power consumption. It also increases performance because a new instruction word can be fetched each memory cycle.

In the arrangements of the present application, the LEA processor core includes four functional units and uses a single issue instruction word. This approach can be referred to as a "4 slot" or "4 issue" architecture. In addition to opcodes for the four functional units in each instruction word, program controller information such as loop count, return, do-loop instruction information are provided in the instruction word. A single instruction word provides all of the opcode information needed for each machine cycle, so the architecture is a single issue architecture.

As can be seen by examination of FIG. 8, the instruction word has fields that correspond to the execution units of the LEA as described above. In the example ISA shown in FIG. 8, the first bit, bit 0, determines whether the instruction is a "1 issue" or "4 issue" instruction. The bits 1-11 of the 32 bit instruction word are used to provide opcodes to the load-store execution unit, in the column labeled "ls: ldstA" a summary of some of the operations for the load store unit are shown with their encoding. A single bit, in this non-limiting example arrangement bit 12 is used, provides a control field for the load coefficient execution unit, in the column labeled "ld: ld_R," this bit is shown with encoding for certain operations. An opcode field for the multiplier in this example is provided by bits 13-18, and in the column labeled "m: mpy," selected operations are shown for this functional unit with some example encoding. The remaining bits of the instruction word, bits 19-31 in this example arrangements, provide the op-codes for controlling the operations of the butterfly/add ALU execution unit. In the column labeled "b:bfly,"some selected operations for this execution unit are shown with their encoding.

Additional "1 slot" operations are shown encoded in table 800 when bit 0 is a "1." These instructions include operations such as register initializations, such as load immediate or "ld_imm" instructions. Additional "1 slot" instructions such as "lshift," "rshift," "pass," "cmpr," "doloop," and "return" for example that are encoded in the table 800. The LEA instruction set is tailored to fit in the 32 bit word length while providing a four slot, single issue instruction word so that each execution unit, the load store unit, the load coefficient unit, the multiplier, and the butterfly/ADD ALU unit, can execute an operation for each LEA machine cycle.

Although an example ISA arrangement is illustrated in FIG. 8, it should be understood that obvious variations can be made to the example which are still within the scope of the present application and these variations are contemplated by the inventors as forming additional arrangements that are within the scope of the present application and which are covered by the appended claims. For example, although bits 1-11 were chosen for the opcodes for the load store unit in the ISA shown in FIG. 8, another set of bits of similar length could be used instead, such as 21-31; without departing from the scope of the present application. More or fewer bits could be used for any one of the execution unit opcodes. The overall relatively short length of the parallel instruction words are important aspects of the arrangements, but the particular bits assigned to an execution unit can be modified to create additional alternative arrangements of the present application.

FIG. 9 depicts in an additional table 900 additional opcode encoding for the load store unit. In FIG. 9, additional operations are detailed with the encoding of bits 1-11 providing operations for the load store unit as part of the short parallel instruction word. In FIG. 9, the opcodes include load, store, and store overflow operations.

Figure 10:
FIG. 10 depicts in an another table further details of the instruction set architecture arrangement of the present application.

FIG. 10 depicts in an additional table 1000 some additional opcodes for the load store execution unit. In FIG. 10, the bits 1-11 are again shown with additional operations for the load store unit to perform.

FIG. 11 depicts in an additional table 1100 the opcodes for the load coefficient execution unit, which in an additional aspect of the present application, requires only a single instruction word bit, bit 12 in the example ISA.

FIG. 12 depicts in yet another table 1200 additional details of opcodes for the multiply execution unit in the example ISA. In FIG. 12, operations such as various multiply operations and a no operation are shown using bits 13-18 in the instruction word.

FIG. 13 depicts in a further table 1300 a portion of the opcodes used to determine the operation the butterfly/ADD ALU execution unit is to perform. In table 1300 a first set of operations are shown. FIGS. 14, 15 and 16 each depict additional opcodes for the butterfly/ADD ALU unit in tables 1400, 1500 and 1600, respectively. In the example ISA described here, the bits 19-31 of the instruction word are used for the butterfly/ADD ALU execution unit. However alternative arrangements that can be created by varying the particular portion of the instruction word used for the butterfly/ADD ALU execution unit, or the bits for the other execution units, are contemplated by the inventors as forming additional arrangements that form further aspects of the present application and which are within the scope of the appended claims. An important feature of some of the arrangements is that the length of the short parallel instruction word be less than or equal to the width of the system bus. In an alternative arrangement, the system bus can be even less width, such as 16 bits, and the short parallel instruction word can be 32 bits, or two system bus widths. In this example, two memory cycles would be used to fetch an instruction word over the system bus. However as described above, the LEA can include local program stores such as code ROM or single port SRAM as shown in FIG. 2 and instruction words can then be retrieved without using the system bus, providing additional performance for the system.

FIG. 17 depicts in another table 1700 a portion of the opcodes used to determine "1 slot" operations. In the example encoding for the ISA in FIG. 17 and in FIG. 8 above, when the first bit, bit 0, is a "1" a "1 slot" operation is indicated. As shown in table 1700, these operations include certain shift operations, load immediate or "ld_imm" operations, load or store operations with immediate operands such as "ls_sp_off," stack pointer update operations such as "add_imm_SP," and program controller (PC) operations such as "pc_dcnt" operations shown in table 1700.

In the arrangements for the LEA processor described above, the four execution units receive a new opcode that can be executed with each new instruction word. The opcodes selected for the ISA and arranged as shown above are optimized for the vector operations and for low power consumption. The address registers for the four execution unit are optimized for the vector operations and provide only address registers for the load store and load coefficient execution units. The data register file is also provided as a non-orthogonal data register architecture that has connections to the execution unit selected to support the vector operations, while minimizing gate count and silicon area for the data register file.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims. Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An integrated circuit, comprising:
a system bus for transferring data between memory devices, processors, and peripheral devices having a data width N, where N is a positive integer;
a central processor unit coupled to the system bus;
a low energy accelerator processor coupled to the system bus and having a plurality of execution units;
a register file comprising a plurality of registers in a non-orthogonal arrangement with the low energy accelerator processor;
a first execution unit of the plurality of execution units configured to read data from and write data to each of the registers and execute a Fast Fourier Transform; and
a second execution unit of the plurality of execution units configured to read data from only a first subset of the registers and write data to only a second subset of the registers, wherein the first subset comprises a fewer number of registers than the second subset.

2. The integrated circuit of claim 1, wherein the low energy accelerator processor includes a floating point flag register to indicate if at least one of the first and second execution units operates on floating point or fixed point data.

3. The integrated circuit of claim 1, wherein the first execution unit is a butterfly/adder ALU unit configured to perform Finite Impulse Response filtering.

4. The integrated circuit of claim 1, comprising a third execution unit of the plurality of execution units configured to read data from only a third subset of the registers and write data to only a fourth subset of the registers.

5. The integrated circuit of claim 4, wherein the third subset comprises the same number of registers as the fourth subset.

6. The integrated circuit of claim 1, wherein the second execution unit is a load store unit of the low energy accelerator processor, the second execution unit being configured to use at least four of the registers as destination registers.

7. The integrated circuit of claim 1, wherein the low energy accelerator processor is configured to execute the Fast Fourier Transform in response to a 32-bit instruction word.

8. The integrated circuit of claim 1, wherein the data width N is 32 bits.

9. The integrated circuit of claim 1, wherein the register file is included with the low energy accelerator processor and directly accessed by only the plurality of execution units.

10. The integrated circuit of claim 1, wherein the low energy accelerator processor comprises a loop count register, a loop start register, and a loop end register configured to control a repetitive loop operation.

11. The integrated circuit of claim 1, wherein none of the registers of the first subset are also part of the second subset.

12. The integrated circuit of claim 11, comprising a third execution unit of the plurality of execution units configured to read data from only a third subset of the registers and write data to only a fourth subset of the registers, wherein at least some of the registers of the third subset are included in the second subset, and wherein none of the registers of the fourth subset overlap with registers of the first subset, the second subset, and the third subset.

13. The integrated circuit of claim 1, comprising a fourth execution unit configured to write data to only a fifth subset of the registers and further configured to not read data from any of the registers.

14. A data processor, comprising:
a system bus coupled to at least one memory and having a data width of N, where N is a positive integer;
a central processor unit coupled to the system bus;
a low energy accelerator processor having a plurality of execution units, coupled to the system bus and configured to execute instruction words having a length of less than or equal to N;
a register file comprising a plurality of registers in a non-orthogonal arrangement with the low energy accelerator processor;
a first execution unit of the plurality of execution units configured to read data from and write data to each of the registers and execute a Fast Fourier Transform; and
a second execution unit of the plurality of execution units configured to read data from only a first number of the registers and write data to only a second number of the registers, wherein each of the first and second numbers is less than the plurality, and wherein the first number is less than the second number.

15. The data processor of claim 14, comprising a third execution unit of the plurality of execution units configured to read data from only a third number of the registers and write data to only a fourth number of the registers, wherein each of the third and fourth numbers is less than the plurality, and wherein the third number is equal to the fourth number.

16. The data processor of claim 14, wherein the first execution unit is a butterfly/adder ALU unit configured to execute the Fast Fourier Transform or Finite Impulse Response filtering in response to an instruction word.

17. The data processor of claim 14, wherein the plurality of execution units comprises a load store execution unit, a load coefficient execution unit, a multiply execution unit, and a butterfly/adder ALU execution unit.

18. The data processor of claim 14, wherein the register file is included with the low energy accelerator processor and directly accessed by only the plurality of execution units.

19. The data processor of claim 14, wherein the low energy accelerator processor comprises a loop count register, a loop start register, and a loop end register configured to control a repetitive loop operation.

20. The data processor of claim 14, wherein the low energy accelerator processor comprises a floating point flag register to indicate if at least one of the first and second execution units operates on floating point or fixed point data.

* * * * *